Dec. 2, 1952 — L. E. FUTTERKNECHT — 2,619,659
REVERSIBLE SPONGE CUSHION
Filed Sept. 26, 1950
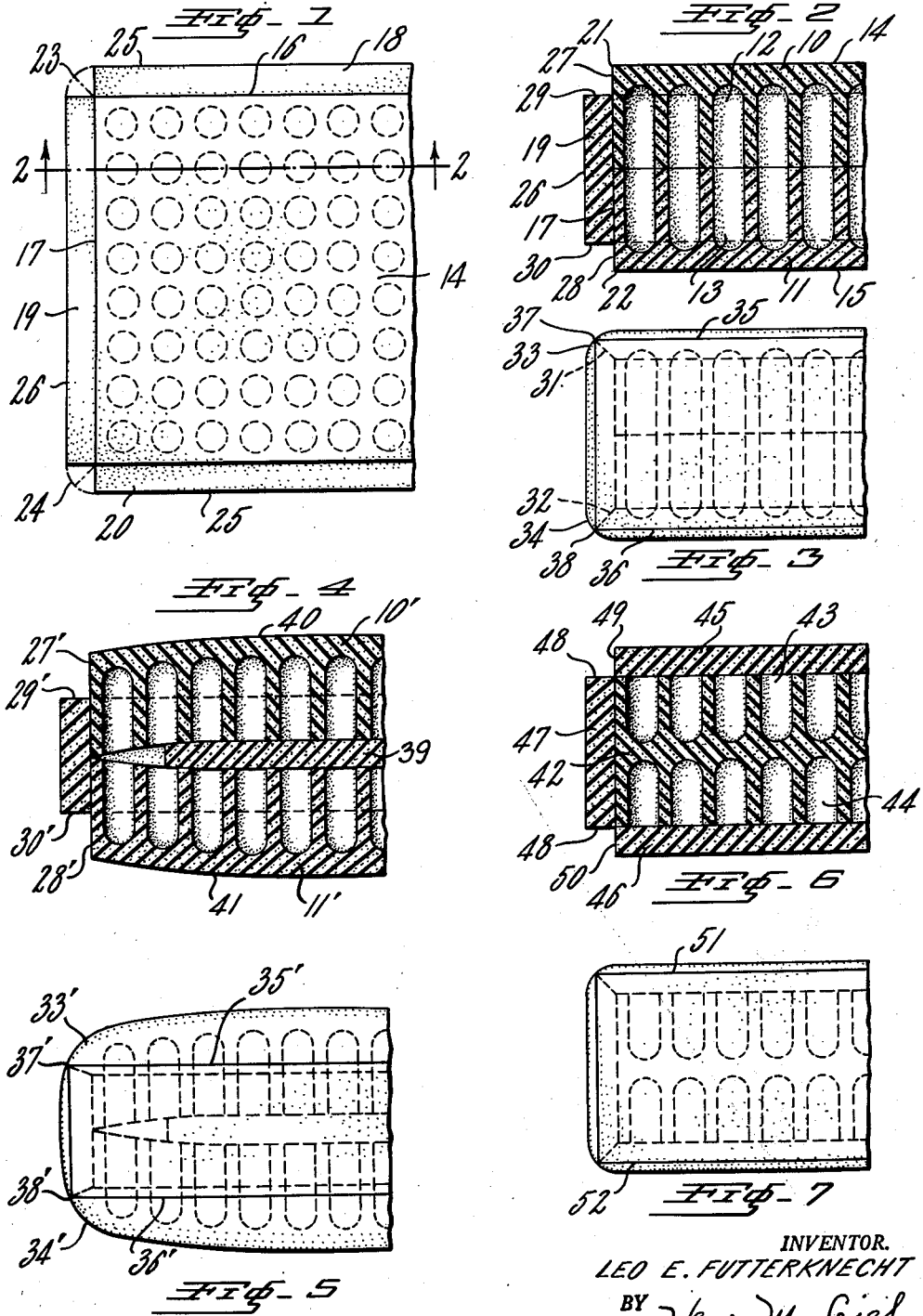
INVENTOR.
LEO E. FUTTERKNECHT
BY Henry M. Leigh
ATTORNEY Patented Dec. 2, 1952

2,619,659

UNITED STATES PATENT OFFICE 2,619,659

REVERSIBLE SPONGE CUSHION

Leo E. Futterknecht, Mishawaka, Ind., assignor to United States Rubber Company, New York, N. Y., a corporation of New Jersey Application September 26, 1950, Serial No. 186,793

8 Claims. (Cl. 5—361)

1

This invention relates to cushions of sponge rubber or like material and has reference more particularly to a reversible cushion structure.

Non-reversible or so-called open-type foam sponge cushions for seat and back cushions for automobiles and upholstery are made of a unitary molded construction of the desired shape with substantially parallel spaced openings or cored out cavities extending from the base of the cushion toward the opposite face but terminating short of such opposite face to provide a smooth seating or back-resting surface of the cushion. The cavities are formed by cores extending into the mold proper into which the latex foam is poured, as shown in U. S. Patents Nos. 2,310,830 and 2,347,117. The latex foam is gelled and vulcanized and the vulcanized sponge cushions which have a smooth skin formation on the outer surfaces from contact with the smooth inner mold surface are manually stripped from the molds. Stripping is a time consuming operation and must be done with great care to avoid tearing the foam rubber sponge. Reversible cushions are made by cementing together two molded half-sections of foam sponge cushions, which are similar to open-type cushions, the surfaces from which the cored openings extend being cemented together. Before cementing, the half sections are tested for compression resistance and those having the same resistance are matched. It is not generally necessary or desirable to cement the entire contacting surfaces, but the edge portions are usually fairly well cemented, leaving air-vent holes, if desired. The entire outer surface of such a cushion has a smooth skin formation since the halves were molded against the smooth inside surface of the mold, the only break in the continuity of such smooth outer surface of the cushion being the fine lined butt joint, which is not objectionable, running around the side of the cushion intermediate the top and bottom faces where the inner surfaces of the half sections were cemented at their edge portions. Reversible cushions of various types, seat and back cushions and bed pillows, have been made in this manner, as shown in U. S. Patent 2,315,391. Because two molded half-sections are required to produce each cushion, the damage due to stripping is high. Other disadvantages are that each half-section must be trimmed of flash and carefully matched with another having the same compression resistance. Also, the manufacture of such reversible cushions has an additional disadvantage in the larger number of molds and increased vulcanizer space that are needed.

2

The object of the present invention is to provide reversible cushions of a spongy rubber-like material such as from foamed rubber latex having side boxings and rounded edges which are constructed of flat sections and yet have a smooth skin texture over their entire exposed surface.

The foregoing and other objects are accomplished as pointed out hereinafter and as shown in the accompanying drawing in which:

Figure 1 is a top view of a portion of a cushion constructed in accordance with the present invention before cementing the rounded edges;

Figure 2 is a sectional view on the line 2—2 of Figure 1;

Figure 3 is a side view of the cushion of Figures 1 and 2 after cementng the rounded edges;

Figure 4 is a sectional view of a modification of a cushion constructed according to the present invention before cementing the rounded edges;

Figure 5 is a side view of the cushion of Figure 4 after cementing the rounded edges;

Figure 6 is a sectional view of another modification of a cushion constructed according to the present invention before cementing the rounded edges; and Figure 7 is a side view of the cushion of Figure 6 after cementing the rounded edges.

The cushion of the present invention is preferably made of foamed rubber latex. Foamed rubber latex may be prepared by whipping the compounded latex containing a foaming agent into a froth or foam, or by stirring the compounded latex into a separately prepared froth or foam. The latex may also be foamed by chemically evolving a gas in the latex as by the decomposition of hydrogen peroxide or a carbonate in the latex in known manner. The latex from which the foam is prepared or the thus prepared latex foam may have a delayed coagulant or gelling agent added to it before the foam is poured into molds or onto conveyors. The foam may be gelled and vulcanized and the sponge rubber product stripped from the molds or conveyor. The technique of preparing latex foams, and molding and gelling and vulcanizing the same is conventional today as illustrated in various patents, such as U. S. Patents 1,852,447, 2,126,275, 2,290,729, 2,309,005, 2,347,117 and 2,441,235. The reversible cushion of the present invention is made from a plurality of sections formed of flat pieces of sponge. Foam sheet stock, as known, may be made by spreading or pouring the latex foam containing a gelling agent on a continuous conveyor with side guide ledges along the conveyor the desired width of the sheet, and, if desired, with dividing ledges across the width of the conveyor to give sheets of any desired length. Alternatively, the conveyor may be equipped with flat pan molds of the desired dimension of the sheets. Foam sheet stock may be made without coring, or with coring from only one face, or with coring from both faces, or with coring through the thickness of the sheet. The surface of sheet sponge which is stripped from a smooth mold surface will have a smooth skin formation which is desirable for the outer surface of the finished cushions. The cut sides of such sheet sponge and the internal structure are much coarser than the smooth skin on the molded surface and hence cannot be exposed in the finished cushion. This is avoided by the construction of the cushions according to the present invention.

One cushion of the invention is illustrated in Figs. 1 to 3. The cushion body is formed of top and bottom sections of sponge rubber 10 and 11, respectively, cut to the desired shape from flat pieces of sponge rubber which are cored from one face as at 12 and 13, respectively. The faces containing the core openings are adhered together by cementing portions of the surfaces to be contacted. The opposite faces 14 and 15 of the sections 10 and 11 have a skin formation from being molded against a flat smooth surface. The cut sides of the cushion body as at 16 and 17 may not be exposed in the finished cushion. Pieces of strip sponge flat stock, as at 18, 19 and 20, are adhered to the cut sides of the cushion body. The strip pieces 18, 19 and 20 are of a width less than the thickness of the cushion, and are between the top and bottom edges 21 and 22 of the cushions forming a boxing for the cushion. The boxing may be one continuous strip around the sides of the cushion rather than separate pieces for each side, if desired. The strip pieces are cemented at their ends as shown in dotted lines 23 and 24 in Fig. 1 when not constructed of one continuous piece. The exposed surface 25 of the sponge strip pieces 18, 19 and 20, or of a single sponge boxing strip, has a skin formation from being molded against a smooth surface. The portions of the sides of the cushion body 27 and 28 not covered by the boxing strips are cemented to the cut sides of the strip material 29 and 30, respectively, as shown at 31 and 32 in Fig. 3, forming the rounded edges 33 and 34 of the cushion, with circumferential seams 35 and 36 around the top and bottom of the cushion. When the portions of the sides of the cushion body not covered by the boxing strips as at 27 and 28 are the same width as the thickness of the strip material as at 29 and 30, and the density of the sponge strip material is the same as that of the cushion body, the circumferential seams 35 and 36 will be situated at the center of the curves of the rounded edges of the cushion, as shown at 37 and 38 in Fig. 3.

The cushion shown in Figs. 4 and 5 is similar generally to the cushion of Figs. 1 to 3 with primed numbers for similar parts. As shown, however, there is an additional flat sponge section 39 which is smaller in size than the top and bottom sponge sections 10' and 11' which is cemented between the top and bottom sections to produce a crown effect in the top and bottom cushion surfaces as at 40 and 41, respectively. Also, the portions of the sides of the cushion body 27' and 28' not covered by the boxing strips are of a width greater than the thickness of the boxing strips, as at 29' and 30', so that when cemented together to form the rounded edges 33' and 34' of the cushion, the circumferential seams 35' and 36' will be situated away from the center of the rounded edges 33' and 34' toward the center of the sides of the cushion, as at 37' and 38'. This gives a side boxing to the pillow with the circumferential seams adjacent the edges away from the flat cushion surfaces which is very desirable. Another method of accomplishing this is to make the boxing strips of a sponge of density greater than the top and bottom sections of the cushion body, whereupon the cushion side portions 27' and 28' may be the same width as the thickness of the boxing strips, as at 29' and 30' (as in Figs. 1 to 3) and still have the circumferential seams situated away from the center of the rounded edges toward the center of the sides of the cushion (as in Fig. 5).

The cushion shown in Figs. 6 and 7 is made from a center flat section 42 with cores extending from both surfaces as at 43 and 44 and cut to size. The top and bottom sections 45 and 46 are of uncored sponge flat stock cut to size. The side boxing strip 47 is the same thickness 48 as the top and bottom sections at 49 and 50. The assembled cushion, as shown in Fig. 7, has the same outside appearance as the cushion shown in Fig. 3, the entire outer surface being covered with a smooth skin construction, and circumferential seams adjacent the edges of the cushions at 51 and 52.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A sponge cushion having a smooth skin formation over its entire outer surface, said cushion comprising a plurality of sections formed from flat pieces of spongy rubber-like material adhered together to form a cushion body having a smooth skin formation over its top and bottom surfaces, strip spongy rubber-like material of a width less than the thickness of said cushion body adhered to the sides of the cushion body between the top and bottom edges of the cushion body and having a smooth skin formation on the exposed surface thereof and forming a boxing for the cushion, and the portions of the sides of the cushion body not covered by the said strip material being adhered to the adjacent sides of said strip material to form rounded edges of said cushion with seams circumferentially of said cushion adjacent the top and bottom surfaces thereof, the entire outer surface of the cushion having a mooth skin formation free of exposed coarse internal sponge structure.

2. A cushion according to claim 1 in which the said plurality of sections formed from flat pieces of spongy rubber-like material comprise top and bottom sections formed from flat pieces of spongy rubber-like material internally cored from one surface thereof with the opposite uncored surfaces being the outside top and bottom surfaces of the cushion.

3. A cushion according to claim 2 with a section formed from a flat piece of spongy rubber-like material between said upper and lower sections and of smaller size than said top and bottom sections whereby to produce a crown effect to said cushion.

4. A cushion according to claim 1 in which the said plurality of sections formed from flat pieces of spongy rubber-like material comprise top and bottom sections formed from pieces of uncored sponge flat stock and a section therebetween formed from a flat piece of spongy rubber-like material internally cored from at least one surface thereof.

5. A sponge cushion having a smooth skin formation over its entire outer surface, said cushion comprising a plurality of sections formed from flat pieces of spongy rubber-like material adhered together to form a cushion body having a smooth skin formation over its top and bottom surfaces, strip spongy rubber-like material of a width less than the thickness of said cushion body adhered to the sides of the cushion body between the top and bottom edges of the cushion body and having a smooth skin formation on the exposed surface thereof and forming a boxing for the cushion, and the portions of the sides of the cushion body not covered by the said strip material being adhered to the adjacent sides of said strip material to form rounded edges of said cushion with seams circumferentially of said cushion adjacent the top and bottom surfaces thereof, said seams being situated away from the center of the curve of the rounded edge toward the center of the sides of the cushion, the entire outer surface of the cushion having a smooth skin formation free of exposed coarse internal sponge structure.

6. A cushion according to claim 5 in which the said plurality of sections formed from flat pieces of spongy rubber-like material comprise top and bottom sections formed from flat pieces of spongy rubber-like material internally cored from one surface thereof with the opposite uncored surfaces being the outside top and bottom surfaces of the cushion.

7. A cushion according to claim 6 with a section formed from a flat piece of spongy rubber-like material between said upper and lower sections and of smaller size than said top and bottom sections whereby to produce a crown effect to said cushion.

8. A cushion according to claim 5 in which the said plurality of sections formed from flat pieces of spongy rubber-like material comprise top and bottom sections formed from pieces of uncored sponge flat stock and a section therebetween formed from a flat piece of spongy rubber-like material internally cored from a least one surface thereof.

LEO E. FUTTERKNECHT.

REFERENCES CITED

The following references are of record in the file of this patent:

UNITED STATES PATENTS

| Number | Name | Date |
| --- | --- | --- |
| 2,293,751 | May | Aug. 25, 1942 |
| 2,295,906 | Lacour | Sept. 15, 1942 |
| 2,499,965 | Miller | Mar. 7, 1950 |

FOREIGN PATENTS

| Number | Country | Date |
| --- | --- | --- |
| 305,911 | Great Britain | Feb. 14, 1929 |
| 782,886 | France | Mar. 25, 1935 |